US012110244B2

(12) United States Patent
Xu et al.

(10) Patent No.: US 12,110,244 B2
(45) Date of Patent: Oct. 8, 2024

(54) DEVICE FOR STRENGTHENING ANAEROBIC SLUDGE DIGESTION BASED ON CONICAL-COILED PIPE COUPLING AND ANAEROBIC SLUDGE DIGESTION METHOD

(71) Applicants: TONGJI UNIVERSITY, Shanghai (CN); Shanghai Urban Pollution Control Engineering Research Center Co., Ltd., Shanghai (CN)

(72) Inventors: Ying Xu, Shanghai (CN); Xiaohu Dai, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 463 days.

(21) Appl. No.: 17/437,811

(22) PCT Filed: Aug. 14, 2020

(86) PCT No.: PCT/CN2020/109033
§ 371 (c)(1),
(2) Date: Sep. 9, 2021

(87) PCT Pub. No.: WO2021/227282
PCT Pub. Date: Nov. 18, 2021

(65) Prior Publication Data
US 2022/0324734 A1    Oct. 13, 2022

(30) Foreign Application Priority Data

May 15, 2020 (CN) ......................... 202010410017.X

(51) Int. Cl.
*C02F 3/28* (2023.01)
*C02F 3/00* (2023.01)
*C02F 11/04* (2006.01)

(52) U.S. Cl.
CPC ............ *C02F 3/2866* (2013.01); *C02F 3/006* (2013.01); *C02F 11/04* (2013.01); *C02F 2301/026* (2013.01)

(58) Field of Classification Search
CPC ........ C02F 3/2866; C02F 3/006; C02F 11/04; C02F 2301/026
(Continued)

(56) References Cited

FOREIGN PATENT DOCUMENTS

| CN | 203360437 U | * | 12/2013 |
| CN | 105884161 A | * | 8/2016 |
| CN | 106116087 A | * | 11/2016 |

OTHER PUBLICATIONS

Machine-generated English translation of CN 203360437, generated on Jan. 4, 2024.*

(Continued)

*Primary Examiner* — Fred Prince
(74) *Attorney, Agent, or Firm* — RAY QUINNEY & NEBEKER P.C.; Paul N. Taylor

(57) ABSTRACT

Disclosed are a device for strengthening anaerobic sludge digestion based on conical-coiled pipe coupling and an anaerobic sludge digestion method. The device comprises a feeder (A-3, B-3), a conical-coiled pipe coupling reactor (A-1, B-1) and a thermostat (A-4, B-4), wherein the bottom of the feeder (A-3, B-3) communicates with the top of the conical-coiled pipe coupling reactor (A-1, B-1), and the bottom of the feeder (A-3, B-3) is flush with the top of the thermostat (A-4, B-4); the conical-coiled pipe coupling reactor (A-1, B-1) is arranged in the thermostat (A-4, B-4); the whole coupling reactor (A-1, B-1) is in a regular cone shape or an inverted cone shape; and a main body of the coupling reactor (A-1, B-1) is a coiled pipe (A-2, B-2).

18 Claims, 3 Drawing Sheets

(58) Field of Classification Search
USPC .................. 210/603, 612, 613, 175, 180
See application file for complete search history.

(56) References Cited

OTHER PUBLICATIONS

Machine-generated English translation of CN 105884161, generated on Jan. 4, 2024.*
Machine-generated English translation of CN 106116087, generated on Jan. 6, 2024.*

* cited by examiner

DEVICE FOR STRENGTHENING ANAEROBIC SLUDGE DIGESTION BASED ON CONICAL-COILED PIPE COUPLING AND ANAEROBIC SLUDGE DIGESTION METHOD

CROSS REFERENCE TO RELATED APPLICATION(S)

This application is a U.S. Nationalization of PCT Application Number PCT/CN2020/109033, filed on Aug. 14, 2020, which claims priority to Chinese Patent Application No. 202010410017.X, filed with the China National Intellectual Property Administration on May 15, 2020 and entitled "DEVICE FOR STRENGTHENING ANAEROBIC SLUDGE DIGESTION BASED ON CONICAL-COILED PIPE COUPLING AND ANAEROBIC SLUDGE DIGESTION METHOD", which is hereby incorporated by reference in its entirety.

TECHNICAL FIELD

The present disclosure relates to the field of treatment technology of perishable organic wastes such as sludge, and particularly relates to a device for strengthening anaerobic sludge digestion based on conical-coiled pipe coupling and an anaerobic sludge digestion method.

BACKGROUND ART

As activated sludge process is popularized and applied in urban domestic sewage treatment plants, a large amount of waste sludge is generated. Sludge contains a large number of perishable organic matters, and serious secondary pollution can be caused if the sludge is not properly treated. The anaerobic digestion technology can recover energy (such as methane) while stably treating the perishable organic matters, and becomes a mainstream technology for realizing sludge resource utilization.

However, the popularization and application of the technology are always limited by low anaerobic sludge digestion efficiency. Therefore, environmental scientists have developed extensive research to strengthen anaerobic sludge digestion, for example, in order to increase the dissolution of organic matters in the sludge and the hydrolysis of bio-organic macromolecules in the sludge, pre-treatment is performed before anaerobic sludge digestion; a good living environment is provided for anaerobic microorganisms, and parameters, such as pH value, oxidation reduction potential and temperature, influencing the activity of the anaerobic microorganisms in an anaerobic digestion system are strictly controlled; and in order to optimize the anaerobic digestion process and improve the performance of the anaerobic digestion process, two-phase anaerobic digestion, multi-stage anaerobic digestion, high-solid-content anaerobic digestion, synergistic anaerobic digestion and the like are proposed. Although the researches improve the efficiency of anaerobic sludge digestion in different degrees, the technology level of anaerobic sludge digestion is not obviously improved based on a traditional anaerobic sludge digestion reactor. It is mainly because that firstly, a traditional anaerobic sludge reactor is completely mixed, high-activity anaerobic microorganisms are difficult to attach to the interior of the reactor for enrichment and are discharged along with biogas residues and an anaerobic digestion solution, so that the loss of dominant anaerobic microorganisms is caused; secondly, the completely mixed traditional anaerobic reactor is difficult to change the microstructure of the sludge, and the mass transfer of organic macromolecules of the sludge and the extracellular electron transfer of the vital activity of anaerobic microorganisms are limited; and thirdly, in the traditional anaerobic sludge digestion reactor, aggregates are easily formed between a sludge matrix and anaerobic microorganisms, and micro contact surfaces between the sludge matrix and the anaerobic microorganisms are difficult to update effectively in real time, so that the solid-liquid micro-interface anaerobic reaction efficiency of the anaerobic microorganisms is limited.

SUMMARY

Aiming at the disadvantages in the prior art, the first purpose of the present disclosure is to provide a device for strengthening anaerobic sludge digestion based on conical-coiled pipe coupling to solve the problem that a traditional anaerobic reactor is low in efficiency, namely based on an anaerobic digestion mode of bionic cattle stomach and human intestines and stomach, the retention time and spatial distribution of perishable organic wastes such as sludge in the reactor are controlled by utilizing a conical structure (in a regular cone shape or inverted cone shape), high-activity hydrolytic acidification bacteria and methanogens and screened, and extracellular electron transfer in an anaerobic microorganism system is strengthened; a coiled pipe and an conductive catalytic coating on the inner wall are used for continuously updating solid-liquid micro-interfaces in perishable organic wastes (such as sludge plant sludge, kitchen wastes, kitchen garage and domestic organic wastes, and a micro-interface anaerobic biochemical reaction of sludge organic matters and anaerobic microorganisms is promoted.

The second purpose of the present disclosure is to provide an anaerobic sludge digestion method using the device.

In order to solve the technical problem, the technical scheme adopted by the present disclosure is as follows:

A device for strengthening anaerobic sludge digestion based on conical-coiled pipe coupling comprises a feeder, a conical-coiled pipe coupling reactor and a thermostat, wherein the bottom of the feeder communicates with the top of the conical-coiled pipe coupling reactor; the conical-coiled pipe coupling reactor is arranged in the thermostat, and the bottom of the conical-coiled pipe coupling reactor extends out of the thermostat and is provided with a discharge hole; the whole conical-coiled pipe coupling reactor is in a regular cone shape or an inverted cone shape; a main body of the conical-coiled pipe coupling reactor is a coiled pipe; and a hole is formed in the shoulder of the conical-coiled pipe coupling reactor to collect biogas.

Preferably, a hole is formed in the shoulder of the coiled pipe in the conical-coiled pipe coupling reactor to collect biogas.

Preferably, a pipe of the coiled pipe in the conical-coiled pipe coupling reactor is made of a heat-conducting and corrosion-resistant material.

Preferably, the interior of the coiled pipe in the conical-coiled pipe coupling reactor is a concave-convex surface or a uniform surface.

Preferably, the coiled pipe in the conical-coiled pipe coupling reactor is made of stainless steel.

Preferably, the inner wall of the conical-coiled pipe coupling reactor is coated with a coating with electrocatalytic activity.

Preferably, the coating of the conical-coiled pipe coupling reactor is a titanium dioxide coating.

Preferably, a pretreatment structure is arranged in the feeder.

Preferably, the pretreatment structure is a screw blade.

Preferably, the temperature of the thermostat is 25-100° C.

To achieve the second purpose, the present disclosure has the following solution:

The present disclosure provides an anaerobic sludge digestion method using the device for strengthening anaerobic sludge digestion based on conical-coiled pipe coupling, comprising the following steps:

(1) treating sludge by a feeder and then enabling the treated sludge to enter a conical-coiled pipe coupling reactor;

(2) adjusting the temperature of a thermostat so that anaerobic microorganisms in the conical-coiled pipe coupling reactor are subjected to constant-temperature culture for 1-40 days, collecting biogas, discharging an anaerobic digestion solution and biogas residues through a discharge hole, and meanwhile, repeating the operation in the first step;

(3) repeating the operation in the second step for multiple times to complete the starting of the conical-coiled pipe coupling reactor; and (4) keeping the temperature of the thermostat, repeating the operation in the first step so that the retention time of the sludge in the conical-coiled pipe coupling reactor is 12-72 h, collecting biogas, and calculating the methane yield and degradation rate of unit organic matters.

Preferably, the step of repeating the operation in the second step for multiple times to complete the starting of the conical-coiled pipe coupling reactor comprises the following substeps in sequence:

adjusting the temperature of the thermostat so that anaerobic microorganisms in the conical-coiled pipe coupling reactor are subjected to constant-temperature culture for 10-30 days, collecting biogas, discharging the anaerobic digestion solution and biogas residues through the discharge hole, and meanwhile, repeating the operation in the first step;

adjusting the temperature of the thermostat so that anaerobic microorganisms in the conical-coiled pipe coupling reactor are subjected to constant-temperature culture for 5-20 days, collecting biogas, discharging the anaerobic digestion solution and biogas residues through the discharge hole, and meanwhile, repeating the operation in the first step; and adjusting the temperature of the thermostat so that anaerobic microorganisms in the conical-coiled pipe coupling reactor are subjected to constant-temperature culture for 1-10 days, collecting biogas, discharging the anaerobic digestion solution and biogas residues through the discharge hole to complete the starting of the conical-coiled pipe coupling reactor.

Preferably, in the first step, the feeder treatment comprises a pretreatment method of strong acid, strong alkali, mechanical stirring, hydrothermal or hydrolase.

Preferably, in the second step and the fourth step, the temperature of the thermostat is 25-100° C. independently.

Preferably, in the second step and the fourth step, the temperature of the thermostat is 37° C. or 55° C. independently.

Preferably, in the fourth step, the retention time of the sludge in the conical-coiled pipe coupling reactor is 12-24 h.

According to the device for strengthening anaerobic sludge digestion based on conical-coiled pipe coupling, based on an anaerobic digestion mode of bionic cattle stomach and human intestines and stomach, the retention time and spatial distribution of perishable organic wastes such as sludge in a reactor are controlled by utilizing a conical structure (in a regular cone shape or inverted cone shape), good adhesion and electron transfer conditions are provided for high-activity hydrolytic acidification bacteria and methanogens, and dominant anaerobic bacteria are screened; a coiled pipe and an conductive catalytic coating on the inner wall are used for continuously updating solid-liquid micro-interfaces in sludge, and a micro-interface anaerobic biochemical reaction of sludge organic matters and anaerobic microorganisms is promoted, so that the device has wide application prospects in stabilization and resourceful treatment of perishable organic wastes such as sewage plant sludge, kitchen wastes, kitchen garbage and domestic organic wastes.

Reference signs in drawings: A-1, regular cone-shaped conical-coiled pipe coupling reactor; B-1, inverted cone-shaped conical-coiled pipe coupling reactor; A-2 and B-2, coiled pipes; A-3 and B-3, feeders; A-4 and B-4, thermostats; A-5 and B-5, shoulders of coiled pipes; and A-6 and B-6, discharge holes in reaction device.

DETAILED DESCRIPTION OF THE EMBODIMENTS

The present disclosure is further described in conjunction with the following embodiments and attached figures.

The present disclosure provides a device for strengthening anaerobic sludge digestion based on conical-serpentine pipe coupling and an anaerobic sludge digestion method.

Figure 1A:
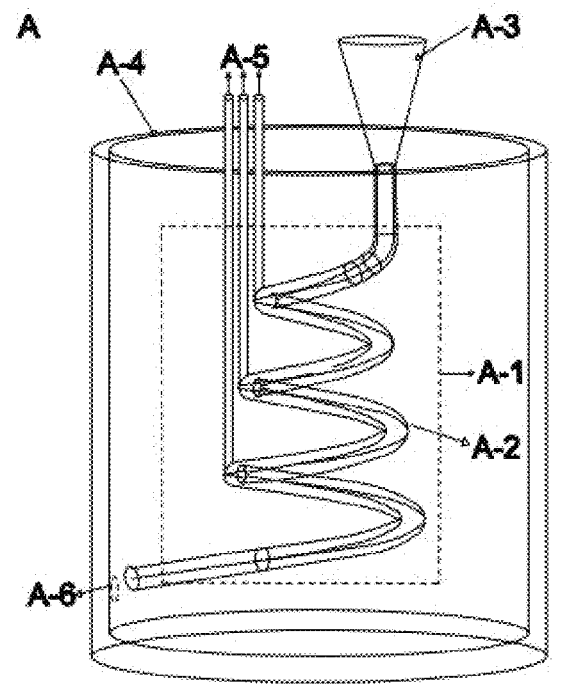
FIG. 1A and FIG. 1B are schematic diagrams of a device for strengthening anaerobic sludge digestion based on conical-coiled pipe coupling in the present disclosure, wherein the device is in a regular cone shape in FIG. 1A, and the device is in an inverted cone shape in FIG. 1B.
Figure 1B:
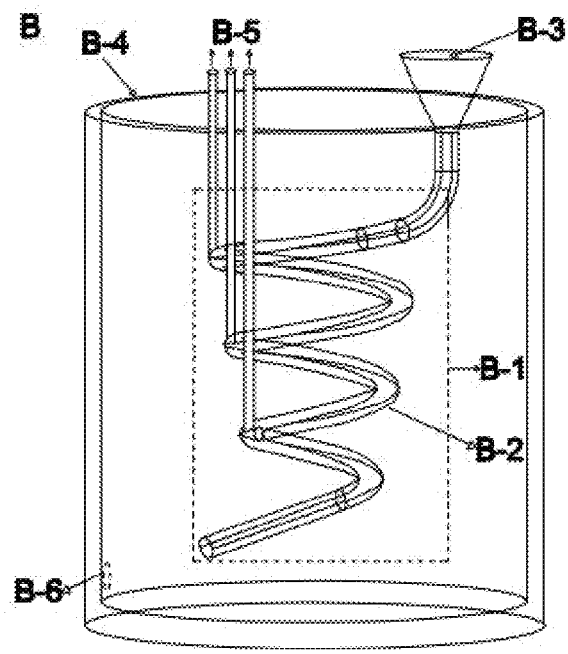
Figure 2A:
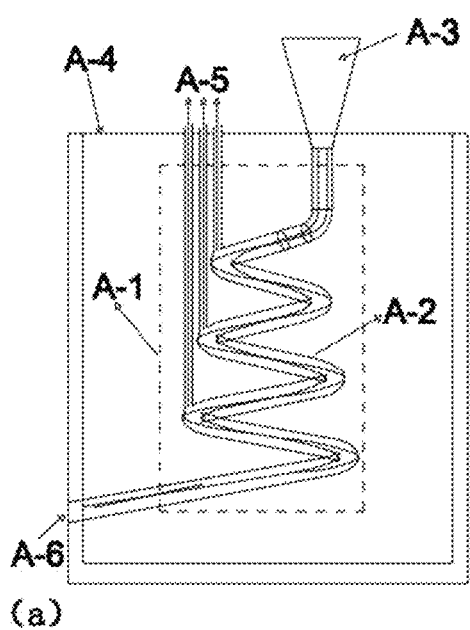
FIG. 2(a) and FIG. 2(b) are schematic diagrams of a normal section of the device for strengthening anaerobic sludge digestion based on conical-coiled pipe coupling in the present disclosure, wherein the device is in a regular cone shape in FIG. 2(a), and the device is in an inverted cone shape in FIG. 2(b)
Figure 2B:
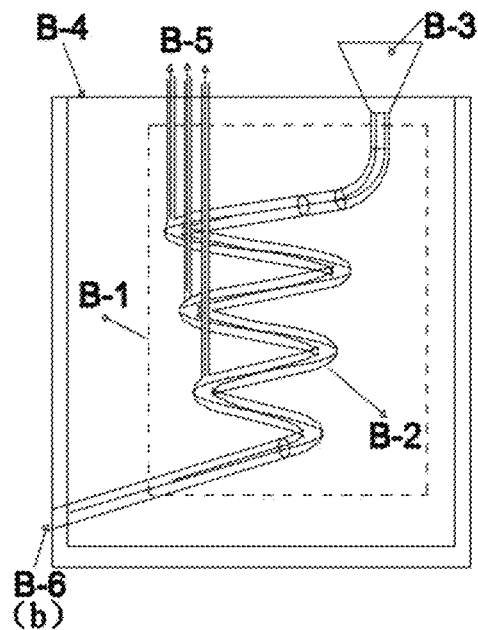
Figure 3A:
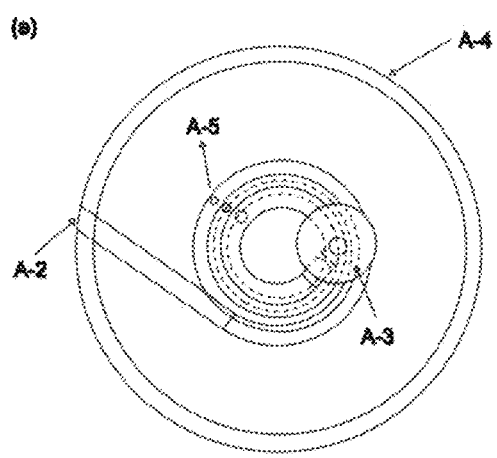
FIG. 3(a) and FIG. 3(b) are top views of the device for strengthening anaerobic sludge digestion based on conical-coiled pipe coupling in the present disclosure, wherein the device is in a regular cone shape in FIG. 3 (a), and the device is in an inverted cone shape in FIG. 3 (b).
Figure 3B:
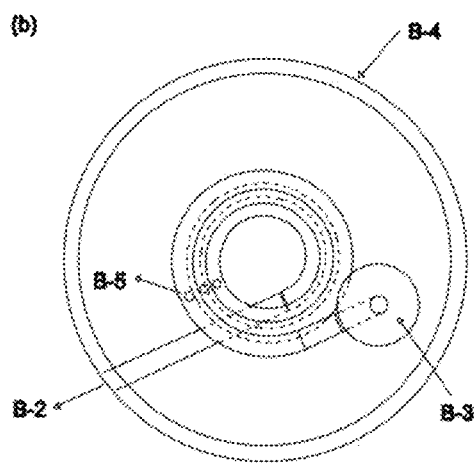

Device for Strengthening Anaerobic Sludge Digestion Based on Conical-Coiled Pipe Coupling As shown in FIG. 1 to FIG. 3, the device for strengthening anaerobic sludge digestion based on conical-coiled pipe coupling provided by the present disclosure comprises a feeder A-3 or B-3, a conical-coiled pipe coupling reactor A-1 or B-1 and a thermostat A-4 or B-4; and the bottom of the feeder A-3 or B-3 communicates with the top of the conical-coiled pipe coupling reactor A-1 or B-1.

In the present disclosure, the bottom of the feeder A-3 communicates with the top of the conical-coiled pipe coupling reactor A-1; and the bottom of the feeder B-3 communicates with the top of the conical-coiled pipe coupling reactor B-1.

In the present disclosure, a pretreatment structure is arranged in the feeder A-3 or B-3; and the pretreatment structure is preferably a screw blade.

In the present disclosure, the conical-coiled pipe coupling reactor A-1 or B-1 is arranged in the thermostat A-4 or B-4; specifically, the conical-coiled pipe coupling reactor A-1 is arranged in the thermostat A-4; and the conical-coiled pipe coupling reactor B-1 is arranged in the B-4.

In the present disclosure, the thermostat A-4 or B-4 is preferably insulated with a water bath or air bath, and the temperature of the thermostat A-4 or B-4 is preferably 25-100° C. independently, more preferably 40-80° C. independently, most preferably 50-60° C. independently.

In the present disclosure, the bottom of the conical-coiled pipe coupling reactor A-1, B-1 extends out of the thermostat A-4, B-4 and is provided with a discharge hole; specifically, the bottom of the conical-coiled pipe coupling reactor A-1 extends out of the thermostat A-4 and is provided with a discharge hole; and the bottom of the conical-coiled pipe coupling reactor B-1 extends out of the thermostat B-4 and is provided with a discharge hole.

In the present disclosure, the whole conical-coiled pipe coupling reactor is in a regular cone shape shown as A-1 or an inverted cone shape shown as B-1. In the present disclosure, preferably, a hole is formed in a shoulder A-5, B-5 of the coiled pipe in the conical-coiled pipe coupling reactor A-1, B-1 to collect biogas; specifically, a hole is formed in the shoulder A-5 of the conical-coiled pipe coupling reactor A-1 to collect biogas or a hole is formed in the shoulder B-5 of the coiled pipe in the conical-coiled pipe coupling reactor B-1 to collect biogas.

In the present disclosure, a main body of the conical-coiled pipe coupling reactor is preferably a coiled pipe A-2 or B-2, and a pipe of the coiled pipe A-2 or B-2 is made of a heat-conducting and corrosion-resistant material, preferably stainless steel.

In the present disclosure, the interior of the coiled pipe A-2 or B-2 in the conical-coiled pipe coupling reactor is preferably a concave-convex surface or a uniform surface and is coated with a coating with electrocatalytic activity, and the coating is preferably a titanium dioxide coating.

In the present disclosure, the dimensions of the conical-coiled pipe coupling reactor are preferably determined according to the working volume and working time, specifically such as the height of the regular cone-shaped conical-coiled pipe coupling reactor A-1, the height of the inverted cone-shaped conical-coiled pipe coupling reactor B-1, and the inner and outer diameters and the length of the coiled pipe A-2, B-2.

Anaerobic Sludge Digestion Method

The present disclosure provides an anaerobic sludge digestion method using the device for strengthening anaerobic sludge digestion based on conical-coiled pipe coupling, comprising the following steps:
(1) taking an appropriate amount of sludge, treating the sludge by a feeder A-3 or B-3 and then enabling the treated sludge to enter a conical-coiled pipe coupling reactor;
(2) adjusting the temperature of the thermostat A-4, B-4 so that anaerobic microorganisms in the conical-coiled pipe coupling reactor are subjected to constant-temperature culture for 1-40 days, collecting biogas, discharging an anaerobic digestion solution and biogas residues, and meanwhile, repeating the operation in the first step, wherein in the present disclosure, the constant-temperature culture time is further preferably 20-40 day;
(3) adjusting the temperature of the thermostat A-4, B-4 so that anaerobic microorganisms in the conical-coiled pipe coupling reactor are subjected to constant-temperature culture for 1-40 days, collecting biogas, discharging the anaerobic digestion solution and biogas residues, and meanwhile, repeating the operation in the first step, wherein in the present disclosure, the constant-temperature culture time is further preferably 10-30 day;
(4) adjusting the temperature of the thermostat A-4, B-4 so that anaerobic microorganisms in the conical-coiled pipe coupling reactor are subjected to constant-temperature culture for 1-40 days, collecting biogas, discharging the anaerobic digestion solution and biogas residues, and meanwhile, repeating the operation in the first step, wherein in the present disclosure, the constant-temperature culture time is further preferably 5-20 day;
(5) adjusting the temperature of the thermostat A-4, B-4 so that anaerobic microorganisms in the conical-coiled pipe coupling reactor are subjected to constant-temperature culture for 1-40 days, collecting biogas, discharging the anaerobic digestion solution and biogas residues to complete the starting of the conical-coiled pipe coupling reactor, wherein in the present disclosure, the constant-temperature culture time is further preferably 1-10 day; and
(6) keeping the temperature of the thermostat A-4, B-4, repeating the operation in the first step so that the retention time of the sludge in the conical-coiled pipe coupling reactor is 12-72 h, collecting biogas, and calculating the methane yield and degradation rate of unit organic matters.

In the present disclosure, in the first step, the sludge is preferably in a flow state, the solid content of the sludge is not limited, and the sludge quantity is preferably determined according to the working volume of the conical-coiled pipe coupling reactor.

In the present disclosure, in the first step, the feeder treatment preferably comprises a pretreatment method of strong acid, strong alkali, mechanical stirring, hydrothermal or hydrolase.

In the present disclosure, in the second step and the fifth step, the temperature of the thermostat is preferably 25-100° C. independently, more preferably 37° C. or 55° C. independently.

In the present disclosure, in the sixth step, the retention time of the sludge in the conical-coiled pipe coupling reactor is preferably 12-24 h, more preferably 15-20 h.

The device for strengthening anaerobic sludge digestion based on conical-coiled pipe coupling and the anaerobic sludge digestion method provided by the present disclosure are described in detail with reference to the following embodiments, but cannot be understood as limitation of the scope of protection of the present disclosure.

Embodiment I

Sludge A is selected from residual sludge of sludge treatment plant A, TS is 2.8%, and VS is 63.7%. The method comprises the following specific implementation steps:
(1) mechanically stirring 500 g of sludge A in a feeder and then enabling the mechanically stirred sludge A to enter a conical-coiled pipe coupling reactor;
(2) adjusting the temperature of a thermostat to be 37° C. so that anaerobic microorganisms in the conical-coiled pipe coupling reactor are subjected to constant-temperature culture for 40 days, collecting biogas, discharging an anaerobic digestion solution and biogas residues, and meanwhile, repeating the operation in the first step;
(3) adjusting the temperature of the thermostat to be 37° C. so that anaerobic microorganisms in the conical-coiled pipe coupling reactor are subjected to constant-temperature culture for 30 days, collecting biogas, discharging the anaerobic digestion solution and biogas residues, and meanwhile, repeating the operation in the first step;

(4) adjusting the temperature of the thermostat to be 37° C. so that anaerobic microorganisms in the conical-coiled pipe coupling reactor are subjected to constant-temperature culture for 20 days, collecting biogas, discharging the anaerobic digestion solution and biogas residues, and meanwhile, repeating the operation in the first step;

(5) adjusting the temperature of the thermostat to be 37° C. so that anaerobic microorganisms in the conical-coiled pipe coupling reactor are subjected to constant-temperature culture for 10 days, collecting biogas, discharging the anaerobic digestion solution and biogas residues to complete the starting of the conical-coiled pipe coupling reactor; and (6) keeping the temperature of the thermostat to be 37° C., repeating the operation in the first step so that the retention time of the sludge in the conical-coiled pipe coupling reactor is 3 days, collecting biogas, and calculating the methane yield and degradation rate of unit organic matters.

Results show that after the conical-coiled pipe coupling reactor stably operates, the methane yield of unit sludge organic matters is 330 mL $CH_4$/g VS, and the sludge organic matter degradation rate is 60%.

Embodiment II

Sludge B is selected from residual sludge of sludge treatment plant B, TS is 1.6%, and VS is 68.2%. The method comprises the following specific implementation steps:

(1) mechanically stirring 500 g of sludge B in a feeder and then enabling the mechanically stirred sludge B to enter a conical-coiled pipe coupling reactor;

(2) adjusting the temperature of the thermostat to be 55° C. so that anaerobic microorganisms in the conical-coiled pipe coupling reactor are subjected to constant-temperature culture for 30 days, collecting biogas, discharging an anaerobic digestion solution and biogas residues, and meanwhile, repeating the operation in the first step;

(3) adjusting the temperature of the thermostat to be 55° C. so that anaerobic microorganisms in the conical-coiled pipe coupling reactor are subjected to constant-temperature culture for 20 days, collecting biogas, discharging the anaerobic digestion solution and biogas residues, and meanwhile, repeating the operation in the first step;

(4) adjusting the temperature of the thermostat to be 55° C. so that anaerobic microorganisms in the conical-coiled pipe coupling reactor are subjected to constant-temperature culture for 10 days, collecting biogas, discharging the anaerobic digestion solution and biogas residues, and meanwhile, repeating the operation in the first step;

(5) adjusting the temperature of the thermostat to be 55° C. so that anaerobic microorganisms in the conical-coiled pipe coupling reactor are subjected to constant-temperature culture for 5 days, collecting biogas, discharging the anaerobic digestion solution and biogas residues to complete the starting of the conical-coiled pipe coupling reactor; and (6) keeping the temperature of the thermostat to be 55° C., repeating the operation in the first step so that the retention time of the sludge in the conical-coiled pipe coupling reactor is 2 days, collecting biogas, and calculating the methane yield and degradation rate of unit organic matters.

Results show that after the conical-coiled pipe coupling reactor stably operates, the methane yield of unit sludge organic matters is 396 mL $CH_4$/g VS, and the sludge organic matter degradation rate is 71%.

Embodiment III

Sludge C is selected from dewatered sludge of sludge treatment plant C, TS is 8.3%, and VS is 65.1%. The method comprises the following specific implementation steps:

(1) mechanically stirring 800 g of sludge C in a feeder and then enabling the mechanically stirred sludge C to enter a conical-coiled pipe coupling reactor;

(2) adjusting the temperature of the thermostat to be 37° C. so that anaerobic microorganisms in the conical-coiled pipe coupling reactor are subjected to constant-temperature culture for 35 days, collecting biogas, discharging an anaerobic digestion solution and biogas residues, and meanwhile, repeating the operation in the first step;

(3) adjusting the temperature of the thermostat to be 37° C. so that anaerobic microorganisms in the conical-coiled pipe coupling reactor are subjected to constant-temperature culture for 25 days, collecting biogas, discharging the anaerobic digestion solution and biogas residues, and meanwhile, repeating the operation in the first step;

(4) adjusting the temperature of the thermostat to be 37° C. so that anaerobic microorganisms in the conical-coiled pipe coupling reactor are subjected to constant-temperature culture for 15 days, collecting biogas, discharging the anaerobic digestion solution and biogas residues, and meanwhile, repeating the operation in the first step;

(5) adjusting the temperature of the thermostat to be 37° C. so that anaerobic microorganisms in the conical-coiled pipe coupling reactor are subjected to constant-temperature culture for 5 days, collecting biogas, discharging the anaerobic digestion solution and biogas residues to complete the starting of the conical-coiled pipe coupling reactor; and (6) keeping the temperature of the thermostat to be 37° C., repeating the operation in the first step so that the retention time of the sludge in the conical-coiled pipe coupling reactor is 3 days, collecting biogas, and calculating the methane yield and degradation rate of unit organic matters.

Results show that after the conical-coiled pipe coupling reactor stably operates, the methane yield of unit sludge organic matters is 360 mL $CH_4$/g VS, and the sludge organic matter degradation rate is 65%.

Embodiment IV

Sludge D is selected from dewatered sludge of sludge treatment plant D, TS is 5.7%, and VS is 67.3%. The method comprises the following specific implementation steps:

(1) mechanically stirring 600 g of sludge D in a feeder and then enabling the mechanically stirred sludge D to enter a conical-coiled pipe coupling reactor;

(2) adjusting the temperature of the thermostat to be 37° C. so that anaerobic microorganisms in the conical-coiled pipe coupling reactor are subjected to constant-temperature culture for 30 days, collecting biogas, discharging an anaerobic digestion solution and biogas residues, and meanwhile, repeating the operation in the first step;

(3) adjusting the temperature of the thermostat to be 37° C. so that anaerobic microorganisms in the conical-coiled pipe coupling reactor are subjected to constant-temperature culture for 20 days, collecting biogas, discharging the anaerobic digestion solution and biogas residues, and meanwhile, repeating the operation in the first step;

(4) adjusting the temperature of the thermostat to be 37° C. so that anaerobic microorganisms in the conical-coiled pipe coupling reactor are subjected to constant-temperature culture for 10 days, collecting biogas, discharging the anaerobic digestion solution and biogas residues, and meanwhile, repeating the operation in the first step;

(5) adjusting the temperature of the thermostat to be 37° C. so that anaerobic microorganisms in the conical-coiled pipe coupling reactor are subjected to constant-temperature culture for 5 days, collecting biogas, discharging the anaerobic digestion solution and biogas residues to complete the starting of the conical-coiled pipe coupling reactor; and (6) keeping the temperature of the thermostat to be 37° C., repeating the operation in the first step so that the retention time of the sludge in the conical-coiled pipe coupling reactor is 2 days, collecting biogas, and calculating the methane yield and degradation rate of unit organic matters. [99] Results show that after the conical-coiled pipe coupling reactor stably operates, the methane yield of unit sludge organic matters is 350 mL $CH_4$/g VS, and the sludge organic matter degradation rate is 65%.

Embodiment V

Sludge E is selected from residual sludge of sludge treatment plant E, TS is 1.5%, and VS is 68.2%. The method comprises the following specific implementation steps:

(1) mechanically stirring 800 g of sludge E in a feeder and then enabling the mechanically stirred sludge E to enter a conical-coiled pipe coupling reactor;

(2) adjusting the temperature of the thermostat to be 42° C. so that anaerobic microorganisms in the conical-coiled pipe coupling reactor are subjected to constant-temperature culture for 40 days, collecting biogas, discharging an anaerobic digestion solution and biogas residues, and meanwhile, repeating the operation in the first step;

(3) adjusting the temperature of the thermostat to be 42° C. so that anaerobic microorganisms in the conical-coiled pipe coupling reactor are subjected to constant-temperature culture for 30 days, collecting biogas, discharging the anaerobic digestion solution and biogas residues, and meanwhile, repeating the operation in the first step;

(4) adjusting the temperature of the thermostat to be 42° C. so that anaerobic microorganisms in the conical-coiled pipe coupling reactor are subjected to constant-temperature culture for 20 days, collecting biogas, discharging the anaerobic digestion solution and biogas residues, and meanwhile, repeating the operation in the first step;

(5) adjusting the temperature of the thermostat to be 42° C. so that anaerobic microorganisms in the conical-coiled pipe coupling reactor are subjected to constant-temperature culture for 10 days, collecting biogas, discharging the anaerobic digestion solution and biogas residues to complete the starting of the conical-coiled pipe coupling reactor; and (6) keeping the temperature of the thermostat to be 42° C., repeating the operation in the first step so that the retention time of the sludge in the conical-coiled pipe coupling reactor is 3 days, collecting biogas, and calculating the methane yield and degradation rate of unit organic matters.

Results show that after the conical-coiled pipe coupling reactor stably operates, the methane yield of unit sludge organic matters is 370 mL $CH_4$/g VS, and the sludge organic matter degradation rate is 67%.

The above description of the embodiments is only intended to assist in understanding the method in the present disclosure and a core idea of the method. It should be noted that those skilled in the art may make several improvements or modifications without departing from the principle of the present disclosure and the improvements or modifications shall fall within the protection scope of claims in the present disclosure. Various modifications to the embodiments are obvious to those skilled in the art, and general principles defined in this specification may be implemented in other embodiments without departing from the spirit or scope of the present disclosure. Therefore, the present disclosure will not be limited to the embodiments described in this specification but extends to the widest scope that complies with the principles and novelty disclosed in this specification.

What is claimed is:

1. A device for strengthening anaerobic sludge digestion based on conical-coiled pipe coupling, comprising a feeder, a conical-coiled pipe coupling reactor and a thermostat, wherein
   a bottom of the feeder communicates with the-a top of the conical-coiled pipe coupling reactor;
   the conical-coiled pipe coupling reactor is arranged in the thermostat, and a bottom of the conical-coiled pipe coupling reactor extends out of the thermostat and is provided with a discharge hole;
   the conical-coiled pipe coupling reactor as a whole is in a regular cone shape or an inverted cone shape;
   a main body of the conical-coiled pipe coupling reactor is a coiled pipe; and
   a hole is formed in a shoulder of the conical-coiled pipe coupling reactor to collect biogas.

2. The device for strengthening anaerobic sludge digestion based on conical-coiled pipe coupling according to claim 1, wherein the hole is formed in the shoulder of the coiled pipe in the conical-coiled pipe coupling reactor; and/or
   a pipe of the coiled pipe in the conical-coiled pipe coupling reactor is made of a heat-conducting and corrosion-resistant material.

3. The device for strengthening anaerobic sludge digestion based on conical-coiled pipe coupling according to claim 2, wherein an interior of the coiled pipe in the conical-coiled pipe coupling reactor is a uniform surface.

4. The device for strengthening anaerobic sludge digestion based on conical-coiled pipe coupling according to claim 2, wherein the coiled pipe in the conical-coiled pipe coupling reactor is made of stainless steel; and/or,
   an inner wall of the conical-coiled pipe coupling reactor is coated with a coating with electrocatalytic activity.

5. The device for strengthening anaerobic sludge digestion based on conical-coiled pipe coupling according to claim 4, wherein the coating with electrocatalytic activity is a titanium dioxide coating.

6. The device for strengthening anaerobic sludge digestion based on conical-coiled pipe coupling according to claim 1, wherein an interior of the coiled pipe in the conical-coiled pipe coupling reactor is a uniform surface.

7. The device for strengthening anaerobic sludge digestion based on conical-coiled pipe coupling according to claim 1, wherein the coiled pipe in the conical-coiled pipe coupling reactor is made of stainless steel; and/or, an inner wall of the conical-coiled pipe coupling reactor is coated with a coating with electrocatalytic activity.

8. The device for strengthening anaerobic sludge digestion based on conical-coiled pipe coupling according to claim 1, wherein a pretreatment structure is arranged in the feeder.

9. The device for strengthening anaerobic sludge digestion based on conical-coiled pipe coupling according to claim 8, wherein the pretreatment structure is a screw blade.

10. The device for strengthening anaerobic sludge digestion based on conical-coiled pipe coupling according to claim 1, wherein a temperature of the thermostat is 25-100° C.

11. An anaerobic sludge digestion method using the device for strengthening anaerobic sludge digestion based on conical-coiled pipe coupling according to claim 1, comprising:

step 1: treating sludge by a feeder and then enabling the treated sludge to enter a conical-coiled pipe coupling reactor;

step 2: adjusting a temperature of a thermostat so that anaerobic microorganisms in the conical-coiled pipe coupling reactor are subjected to constant-temperature culture for 1-40 days, collecting biogas, discharging an anaerobic digestion solution and biogas residues through a discharge hole, and meanwhile, repeating step 1;

step 3: repeating step 2 for multiple times to complete starting of the conical-coiled pipe coupling reactor; and step 4: keeping the temperature of the thermostat, repeating step 1 so that retention time of the sludge in the conical-coiled pipe coupling reactor is 12-72 h, and collecting biogas.

12. The method according to claim 11, wherein repeating step 2 for multiple times to complete the starting of the conical-coiled pipe coupling reactor comprises:

adjusting the temperature of the thermostat so that anaerobic microorganisms in a conical-coiled pipe coupling reactor are subjected to constant-temperature culture for 10-30 days, collecting biogas, discharging the anaerobic digestion solution and biogas residues through the discharge hole, and meanwhile, repeating step 1;

adjusting the temperature of the thermostat so that anaerobic microorganisms in the conical-coiled pipe coupling reactor are subjected to constant-temperature culture for 5-20 days, collecting biogas, discharging the anaerobic digestion solution and biogas residues through the discharge hole, and meanwhile, repeating step 1; and adjusting the temperature of the thermostat so that anaerobic microorganisms in the conical-coiled pipe coupling reactor are subjected to constant-temperature culture for 1-10 days, collecting biogas, discharging the anaerobic digestion solution and biogas residues through the discharge hole to complete the starting of the conical-coiled pipe coupling reactor.

13. The method according to claim 12, wherein, in step 2 and step 4, the temperature of the thermostat is 25-100° C. independently.

14. The method according to claim 12, wherein, in step 2 and step 4, the temperature of the thermostat is 37° C. or 55° C. independently.

15. The method according to claim 12, wherein, in step 4, the retention time of the sludge in the conical-coiled pipe coupling reactor is 12-24 h.

16. The method according to claim 11, wherein, in step 1, a feeder treatment comprises a pretreatment method of strong acid, strong alkali, mechanical stirring, hydrothermal or hydrolase.

17. The method according to claim 11, wherein, in step 2 and step 4, the temperature of the thermostat is 25-100° C. independently.

18. The method according to claim 11, wherein, in step 2 and step 4, the temperature of the thermostat is 37° C. or 55° C. independently.

* * * * *